United States Patent [19]
Saito

[11] Patent Number: 5,914,947
[45] Date of Patent: Jun. 22, 1999

[54] MOBILE RADIO COMMUNICATION SYSTEM WHICH ALLOCATES SPREAD CODES MOBILES WHICH ARE ABLE TO DETERMINE THE DISTANCE BETWEEN A MOBILE AND A BASE STATION

[75] Inventor: Naritoshi Saito, Hino, Japan

[73] Assignee: Kabushiki Kaisha Toshiba, Kanagawa-ken, Japan

[21] Appl. No.: 08/553,647

[22] PCT Filed: Apr. 5, 1995

[86] PCT No.: PCT/JP95/00657

§ 371 Date: Dec. 1, 1995

§ 102(e) Date: Dec. 1, 1995

[87] PCT Pub. No.: WO95/27380

PCT Pub. Date: Oct. 12, 1995

[30] Foreign Application Priority Data

Apr. 5, 1994 [JP] Japan ................................ 6-067141

[51] Int. Cl.[6] .......................... H04B 7/212; H04B 7/216; H04J 3/00
[52] U.S. Cl. .......................... 370/337; 370/441; 370/320; 370/342
[58] Field of Search ..................... 370/915, 335, 370/329, 328, 441, 320, 319, 342

[56] References Cited

U.S. PATENT DOCUMENTS

| 5,170,412 | 12/1992 | Massey | 375/1 |
| 5,260,967 | 11/1993 | Schilling | 375/1 |
| 5,373,502 | 12/1994 | Turban | 370/18 |

FOREIGN PATENT DOCUMENTS

| 2093566 | 10/1993 | Canada . | |
| 2092292 | 6/1996 | Canada . | |
| 0 295 227 A1 | 12/1988 | European Pat. Off. | H04Q 7/02 |
| 4-40024 | 2/1992 | Japan . | |
| 6-268575 | 9/1994 | Japan . | |
| WO 93/03558 | 2/1993 | WIPO . | |

OTHER PUBLICATIONS

PCT/ISA/210.

*Primary Examiner*—Douglas W. Olms
*Assistant Examiner*—David R Vincent
*Attorney, Agent, or Firm*—Finnegan, Henderson, Farabow, Garrett & Dunner, L.L.P.

[57] ABSTRACT

In a mobile radio communication system for performing radio communication between a base station and a plurality of mobile stations by a code division multiple access method, a plurality of slots (T1 to T4) for a forward link from a base station (BS) to a mobile station (MS) and a plurality of slots R1 to R4 for a reverse link from the mobile station (MS) to the base station (BS) are set on a first radio frequency f2 in a time-division multiplexing manner. The slots are set in accordance with the distance between the base station and the mobile station, and the transmission power of the base station in each slot is associated with this distance. The transmission power is low in the slot associated with a short distance between the base station and the mobile station, and the transmission power is high in the slot associated a long distance between the base station and the mobile station. The mobile station (MS) detects the received electric field intensity of a pilot/sync signal coming from the base station (BS) with a second radio frequency, and sends the detected information to the base station (BS). On the basis of the detected value of the received electric field intensity of the mobile station (MS) sent from the mobile station (MS), the base station (BS) determines the distance between the base station and the mobile station, selects the associated pair of slots from among the pairs of slots T1/R1 to T4/R4, thereby allocating the selected slots to this mobile station (MS).

44 Claims, 6 Drawing Sheets

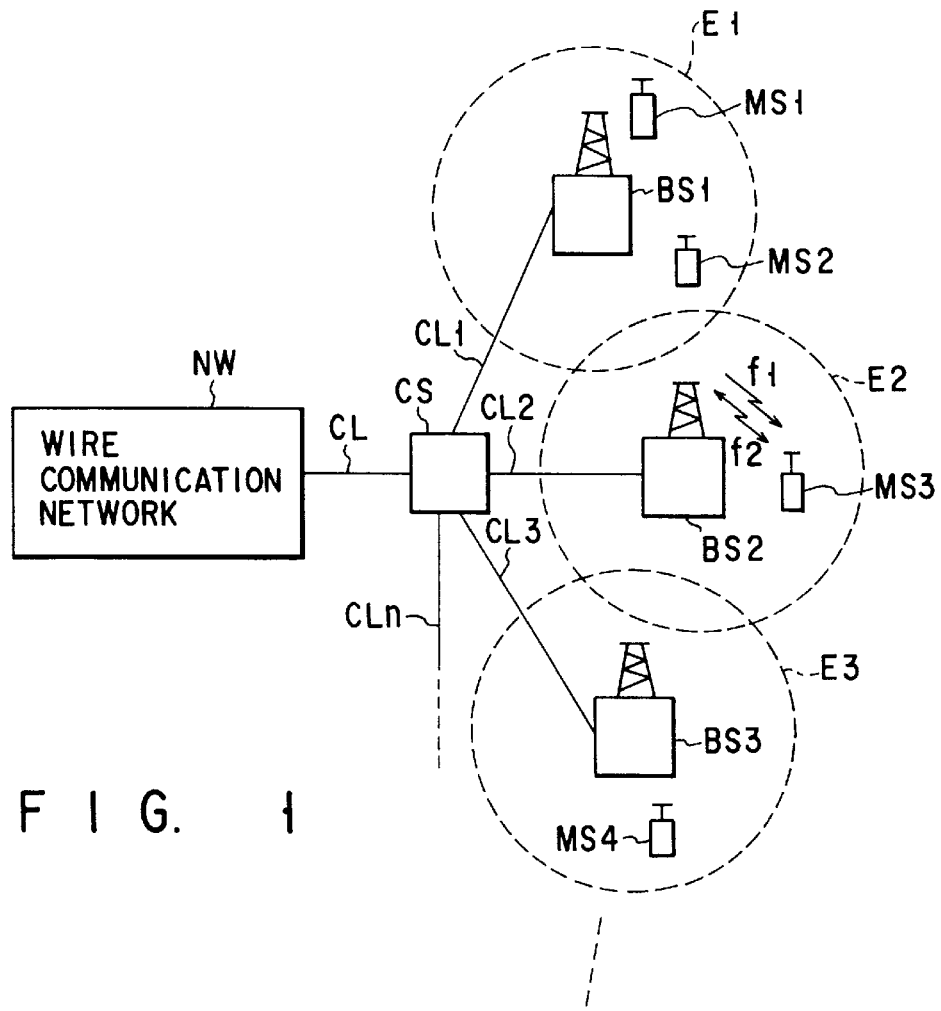
F I G. 1
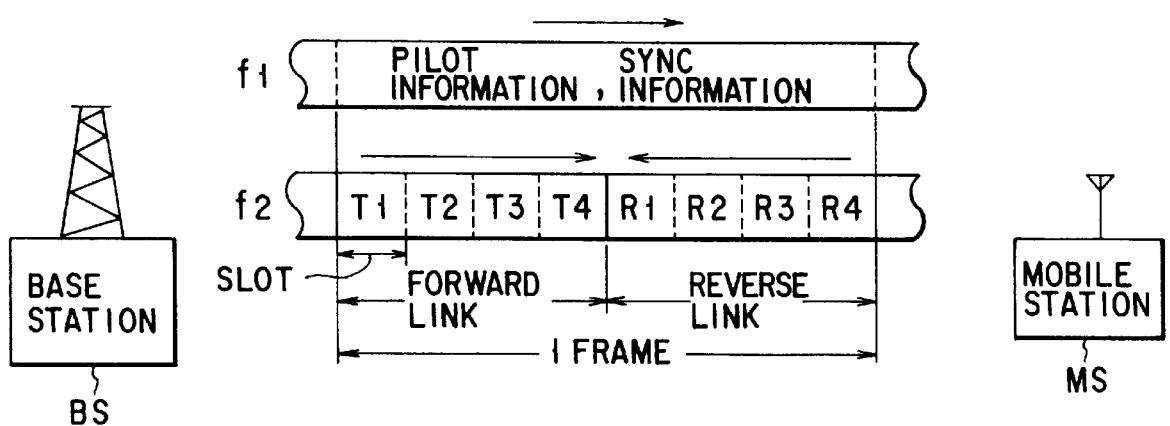
F I G. 2

| DISTANCE AREA | A1 | A2 | A3 | A4 |
|---|---|---|---|---|
| SLOT | T1 R1 | T2 R2 | T3 R3 | T4 R4 |

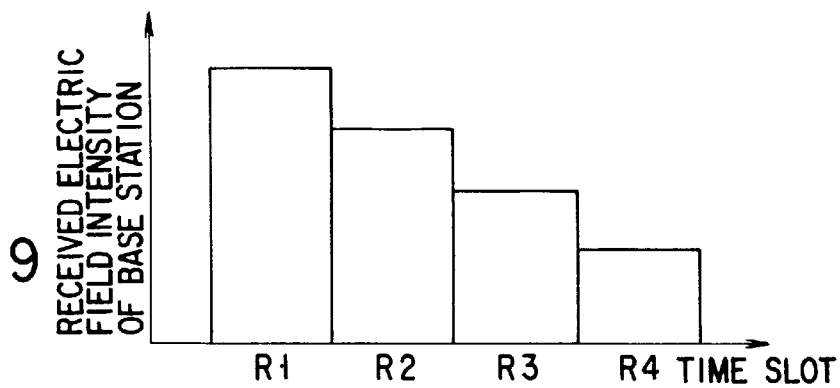
F I G. 9
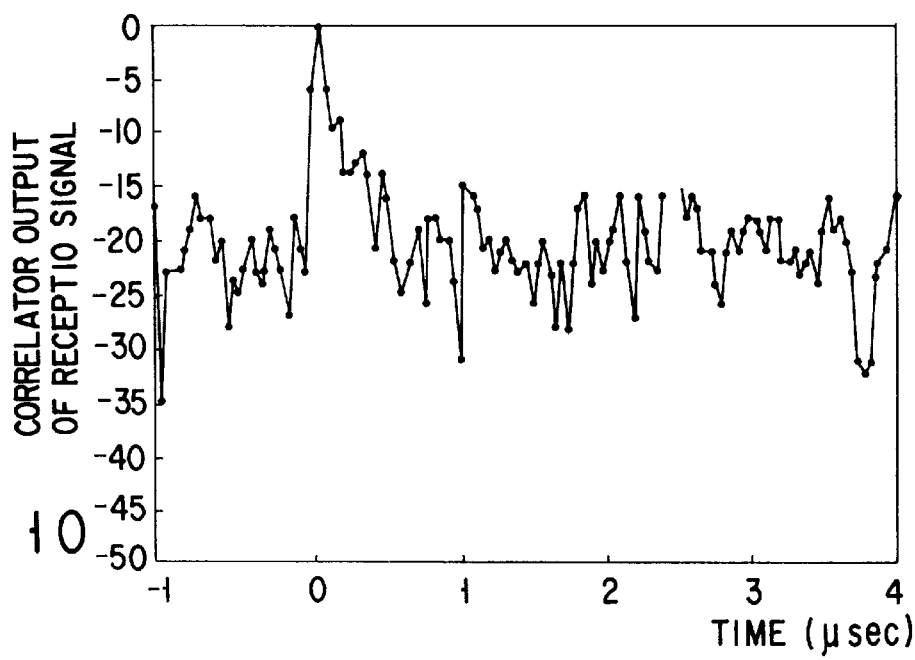
F I G. 10
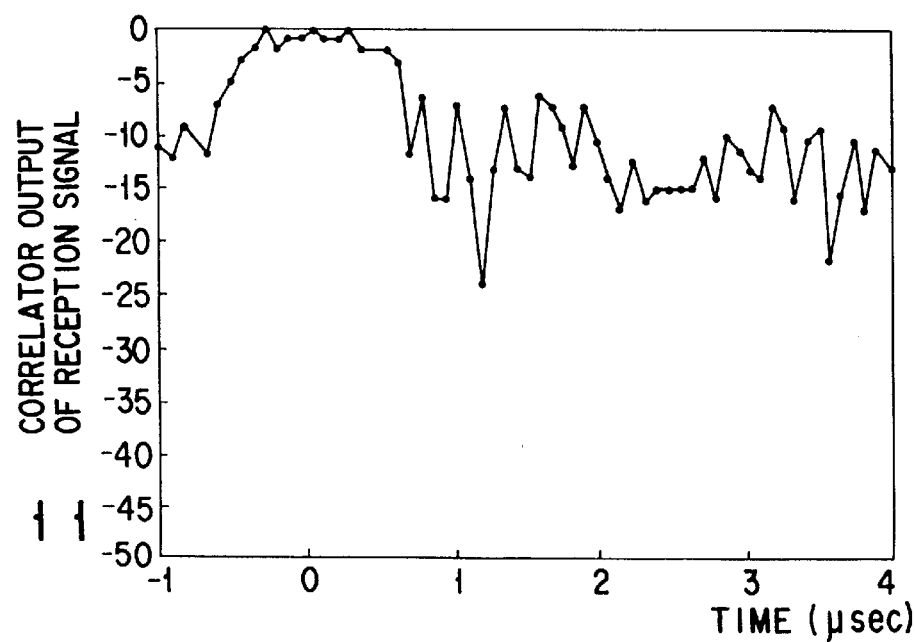
F I G. 11

MOBILE RADIO COMMUNICATION SYSTEM WHICH ALLOCATES SPREAD CODES MOBILES WHICH ARE ABLE TO DETERMINE THE DISTANCE BETWEEN A MOBILE AND A BASE STATION

TECHNICAL FIELD

The present invention relates generally to a mobile radio communication system such as an automobile telephone system, a portable telephone system, a cordless telephone system or a radio LAN system, and more particularly to a mobile radio communication system adopting a spread spectrum communication method.

BACKGROUND ART

Recently, attention has been paid to a spread spectrum communication method which is advantageous in preventing interference or jamming, as one of communication methods applicable to a mobile radio communication system.

With the spread spectrum communication method, a code division multiple access (CDMA) system is realized. For example, in a transmission-side apparatus, digitized voice data and image data (base band signals) are subjected to modulation by a digital modulation method such as a PSK or FSK modulation method. Then, the modulated transmission data is spectrum-spread by using spread codes such as pseudo-noise codes and converted to a wide-band signal. The wide-band signal is then converted to a radio frequency signal and transmitted. On the other hand, in a reception-side apparatus, the received radio frequency signal is frequency-converted to an intermediate frequency signal or a base band frequency signal. Then, the frequency-converted signal is inversely spread by using the same codes as the spread codes used in the transmission-side apparatus. Thereafter, digital demodulation is performed by a digital demodulation method such as a PSK or FSK demodulation method. Thus, the reception data is reproduced. By varying the spread codes, a plurality of transmission/reception apparatuses can be used simultaneously with the same frequency.

In this type of CDMA system, a so-called "near-far problem" occurs due to the distance between a base station and a mobile station. Specifically, this problem occurs when a plurality of mobile stations simultaneously perform communication with the same frequency. In this case, the power of electric waves transmitted from the mobile station located near the base station is greater than the power of electric waves transmitted from the mobile station located far from the base station. As a result, the base station cannot receive the radio waves from the far mobile station, owing to the high-power radio waves from the near mobile station. Consequently, radio connection control between the base station and the far mobile station cannot be performed, or the quality in communication is degraded.

In the prior art, in order to solve this problem, the following technique has been proposed. That is, the intensity of a received electric field is measured in the mobile station or the base station. On the basis of the measured result, the transmission power of the mobile station is controlled by an open-loop control method or a closed-loop control method. Irrespective of the distance between the base station and the mobile stations the base station can receive at all times the electric waves from the mobile station at a constant reception power.

In the open-loop transmission power control methods the electric field intensity (received electric field intensity) of the constant-power radio frequency signal transmitted from the base station is measured in the mobile station. Based on the measured value, the mobile station determines the transmission power of itself. Specifically, when the received electric field intensity of the radio frequency signal coming from the base station is low, it is determined that the distance between the base station and the mobile station is large, and the transmission power is set at a high value. On the other hands when the received electric field intensity of the radio frequency signal coming from the base station is highs it is determined that the distance between the base station and the mobile station is small, and the transmission power is set at a low value.

On the other hands in the closed-loop transmission power control methods the electric field intensity (received electric field intensity) of a constant-power radio frequency signal transmitted from the mobile station is measured in the base station. Based on the measured values the base station generates command information to control the transmission power of the mobile station and sends the information to the associated mobile station via a forward link. The mobile station controls the transmission power of itself in accordance with the command information.

These control methods, however, have the following problems. In the mobile radio communication systems such as an automobile telephone system and a portable telephone system, different radio frequencies are generally used in a forward link from the base station to the mobile station and in a reverse link from the mobile station to the base station. Thus, in the open-loop transmission power control method, the frequency of the radio signal with which the mobile station measures the received electric field intensity differs from the frequency of the radio signal for actual transmission. Thus, the distance between the base station and mobile station cannot exactly be measured. The transmission power cannot properly controlled owing to the influence of frequency selectivity fading, etc.

In the closed-loop transmission power control method, on the other hand, the influence due to frequency selectivity fading, etc. can be eliminated. Therefore, more proper control can be carried out, than in the open-loop control method. However, since the closed-loop transmission power control method is time-consuming, this method is generally performed only when the base station and mobile station are connected by a speech channel. Thus, the open-loop control must be relied upon before the radio link due to the speech channel is formed, i.e. while the radio connection control between the base station and mobile station is performed by using an access channel. As a result, the influence of frequency selectivity fading, etc. cannot be avoided. Furthermore, in this method, command information needs to be contained in a sync signal transmitted from the base station to the mobile station, the quantity of the information of the sync signal decreases that much.

As has been described above, in the conventional CDMA radio communication system, the influence of frequency selectivity fading, etc. cannot be avoided, or the transmission power cannot properly be controlled unless during the speech time period. Thus, the "near-far" problem is not solved, resulting in degradation in quality of speech or in unprecise radio connection control.

The object of the present invention, therefore, is to provide a mobile radio communication system capable of effectively solving the "near-far" problem without precisely controlling the transmission power of the mobile station, thereby enhancing the quality of speech and the reliability of radio connection control.

DISCLOSURE OF THE INVENTION

According to the present invention, there is provided a mobile radio communication system for performing radio communication between a base station and a plurality of mobile stations by using a spread spectrum method, wherein a common frequency is allocated to a forward link from the base station to the mobile station and to a reverse link from the mobile station to the base station, and a signal transmitted with the common frequency has a communication format in which a plurality of forward link slots and a plurality of reverse link slots are time-division multiplexed, at least one of the base station and the mobile station comprising means for detecting a distance between the mobile station and the base station; and means for selecting a predetermined forward link slot and a predetermined reverse link slot from among the forward link slots and reverse link slots on the basis of the detection result of the distance detection means, and allocating the selected slots to radio communication between the base station and the mobile station.

According to the invention, there is provided a mobile radio communication system for performing radio communication between a base station and a plurality of mobile stations by using a spread spectrum method, wherein different frequencies are allocated to a forward link from the base station to the mobile station and to a reverse link from the mobile station to the base station, and a signal transmitted by the forward link and reverse link has a communication format in which a plurality of forward link slots and a plurality of reverse link slots are time-division multiplexed, at least one of the base station and the mobile station comprising means for detecting a distance between the mobile station and the base station; and means for selecting a predetermined forward link slot and a predetermined reverse link slot from among the forward link slots and reverse link slots on the basis of the detection result of the distance detection means, and allocating the selected slots to radio communication between the base station and the mobile station.

The distance detection means is provided in the mobile station, and comprises means for measuring a received electric field intensity of the sync information transmitted from the base station, and means for transmitting a measured result of the received electric field intensity to the base station. The slot allocation means is provided in the base station, and comprises means for allocating to the radio communication a predetermined forward link slot and a predetermined forward link slot of the slots associated with the received electric field intensity, on the basis of the measured result of the received electric field intensity transmitted from the mobile station.

The base station transmits at least sync information to the mobile station by using a sync radio frequency different from the radio frequency of the forward link and reverse link, and the mobile station performs radio communication by the forward link and reverse link on the basis of the sync information transmitted from the base station.

The base station comprises means for controlling a transmission power for the radio communication for each of the forward link slots.

According to the present invention, predetermined slots are allocated to the mobile station in accordance with the distance between the base station and the mobile station. Specifically, the mobile station performs radio transmission, with the same slots used by a mobile station having the same distance from the base station. Thus, the mobile station located far from the base station and the mobile station near the base station do not transmit electric waves simultaneously. Even if the received electric field intensity of electric waves coming from the mobile station located near the base station is greater than the received electric field intensity of electric waves coming from the mobile station located far from the base station, the base station can surely receive the radio communication signal from the remote mobile station. That is, the "near-far" problem does not occur even if the transmission power of each mobile station is not precisely controlled. Therefore, high-quality speech and precise radio connection control can be performed, irrespective of the time periods of speech and radio connection.

Full duplex radio communication is performed between the base station and the mobile station by using the forward link slots and reverse link slots set on the common radio frequency. Thus, even if the open-loop transmission power control method is adopted, the mobile station can properly control the transmission power, without suffering the influence of frequency selectivity fading, etc.

In addition, the sync radio frequency is set separately from the radio frequency for radio communication, and the sync information is transmitted from the base station to the mobile station with use of this sync radio frequency. The synchronism for time-division multiple communication is attained in the mobile station on the basis of the sync information transmitted from the base station. Thus, stable radio communication can be performed, while the synchronism is maintained between the base station and the mobile station.

Furthermore, when the sync radio frequency is used, the received electric field intensity of the sync signal coming with this sync radio frequency may be measured in the mobile station and the measured information may be sent to the base station, while the base station selects and allocates the forward link slot and reverse link slot on the basis of the sent measured information of the received electric field intensity. In this case, the slot allocation control can be performed, for example, by using the closed-loop for transmission power control with no change. Thereby, the control system can be simplified.

Besides, if the transmission power of the base station is controlled within a range preset for each forward link slot, transmission can be performed with a high transmission power from the base station to the mobile stations, for example, located far from the base station, and transmission can be performed with a low transmission power from the base station to the mobile stations located near the base station. Thereby, as compared to the case where radio signals are transmitted at high transmission power irrespective of the position of the mobile station, the energy efficiency of the base station can be enhanced and such undesirable factors as interference with other radio zones can be reduced.

BRIEF DESCRIPTION OF THE DRAWINGS

FIG. 1 schematically shows the structure of a cellular mobile communication system according to an embodiment of the present invention;

FIG. 2 shows a radio transmission format of the system according to the embodiment of the invention;

FIG. 9 shows a received electric field intensity for each slot in the base station of this embodiment;

FIG. 10 is a characteristic graph showing the occurrence of multi-path fading when the spread code rate is set at 8 Mbps; and FIG. 11 is a characteristic graph showing the occurrence of multi-path fading when the spread code rate is set at 1.2 Mbps.

BEST MODE OF CARRYING OUT THE INVENTION

Figures 3A, 3B:
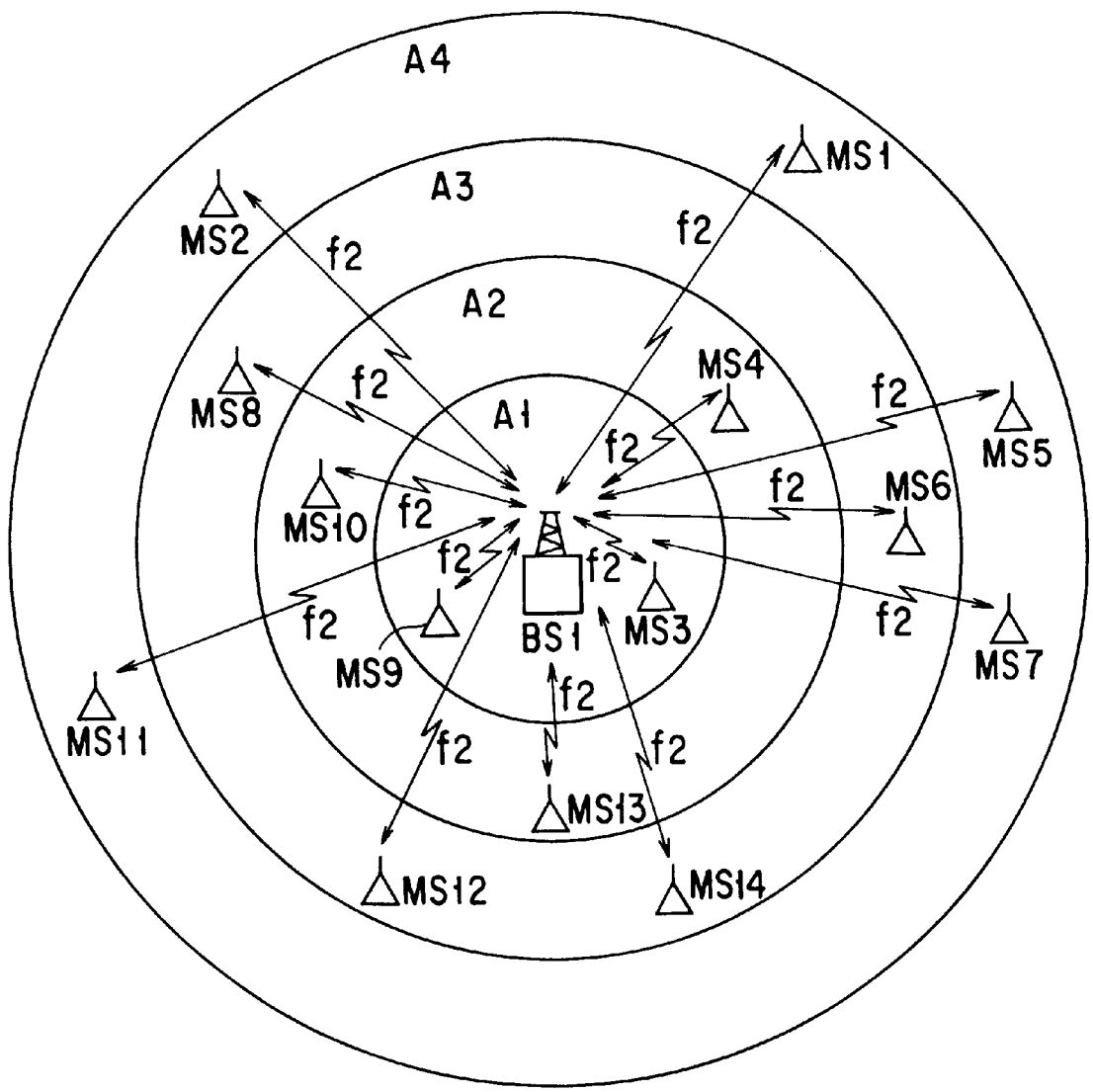
FIGS. 3A and 3B illustrate a slot allocation method for allocating a slot to each of mobile stations in the system according to the embodiment of the invention.

The present invention will now be described in detail with reference to the accompanying drawings.

FIG. 1 schematically shows the structure of a cellular mobile communication system or an embodiment of a mobile radio communication system according to the present invention.

The cellular mobile communication system comprises a control station CS, a plurality of base stations BS1, BS2, ... and a plurality of mobile stations MS1, MS2, .... The control station CS is connected to a wired communication network NW via wired lines CL. The base stations BS1, BS2, ... are connected to the control station CS via the wired lines CL1, CL2, .... The base stations BS1, BS2, ... constitutes respectively, radio zones E1, E2, ... called "cells." Radio frequencies are allocated to the base stations BS1, BS2, ... such that the allocated radio frequencies are different between at least adjacent radio zones.

The base stations BS1, BS2, ... carry out radio communications with the mobile stations located within the radio zones E1, E2, ... formed by the base stations BS1, BS2, ... by using the allocated radio frequencies in a CDMA-TDMA-TDD method in which a code division multiple access (CDMA) method of spread spectrum type is combined with a time division multiple access/time division duplex (TDMA-TDD) method.

Specifically, when the radio communication is performed a first radio frequency f1 for synchronization and a second radio frequency f2 for communication, as shown in FIG. 2, are set between the base stations BS1, BS2 ... and mobile stations MS1, MS2, ....

The first radio frequency f1 is used to transmit, from the base stations BS1, BS2, ... to the mobile stations MS1, MS2, ..., a pilot signal for facilitating code synchronization of the mobile stations MS1, MS2, ... and a sync signal. The sync signal includes time information and frame and slot timing signals. On the other hand, the second radio frequency f2 is used to transmit speech voice data between the base station and the mobile station. FIG. 2 shows a transmission format of the second radio frequency f2. In the transmission format of the second radio frequency f2, one frame is divided into a forward link period (a first half portion) and a reverse link period (a second half portion). The forward link period and reverse link period are divided into four time slots T1 to T4 and four time slots R1 to R4, respectively. Specifically, the system according to the present embodiment differs from the conventional CDMA system in that the forward link and reverse link are set at the same radio frequency f2.

The bands of first and second radio frequencies f1 and f2 are set as broad bands in order to effectively perform diversity synthesis in RAKE reception. Thus, the code spread rate (chip rate) for spread spectrum is set at, e.g. 8.13 Mbps.

The base stations BS, BS2 ... transmit the pilot signal and sync signal to the mobile stations MS1, MS2, ... by using the first radio frequency f1. In communications the mobile stations MS1, MS2, ... receive the pilot signal and sync signal coming from the base stations BS1, BS2, ... by using the first radio frequency f1 and extract timing information from the received signals. On the basis of the timing information, frame synchronization and slot synchronization are achieved for the radio communication signal transmitted with the second radio frequency f2.

When the communication is performed between the base stations BS1, BS2, ... and mobile stations MS1, MS2, ..., one of four pairs of forward link slots and reverse link slots T1/R1 to T4/R4 of the second radio frequency f2, which corresponds to the measured result of the distance, is selected on the basis of a predetermined relationship of correspondency between the distance and slots. The slot pair is allocated to the mobile stations MS1, MS2 .... The distance is measured such that the mobile station MS1, MS2, ... measures the received electric field intensity of the radio carrier wave signal for synchronization transmitted from the base station BS1, BS2, ... with the first radio frequency f1 at a predetermined transmission power. The information on the received electric field intensity measured by the mobile station MS1, MS2, ... is sent to the base station BS1, BS2, .... In the base station BS1, BS2, ... the slot pair associated in advance with the sent information is determined and informed to the mobile station MS1, MS2, .... Thus, the slots are allocated.

FIGS. 3A and 3B show an example of the relationship of correspondency between the measured result of the received electric field intensity and the slots. As is shown in FIG. 3A, the radio zone formed by the base station BS is divided into four areas A1 to A4 in accordance with the received electric field intensity of electric waves in the mobile station MS transmitted from the base station BS, i.e. in accordance with the distance between the base station BS and the mobile station MS. The areas A1 to A4 are made to correspond to four pairs of slots T1/R1 to T4/R4, as shown in FIG. 33. The relationship of correspondency is stored in a memory table within a control circuit of the base station BS.

Figure 4:
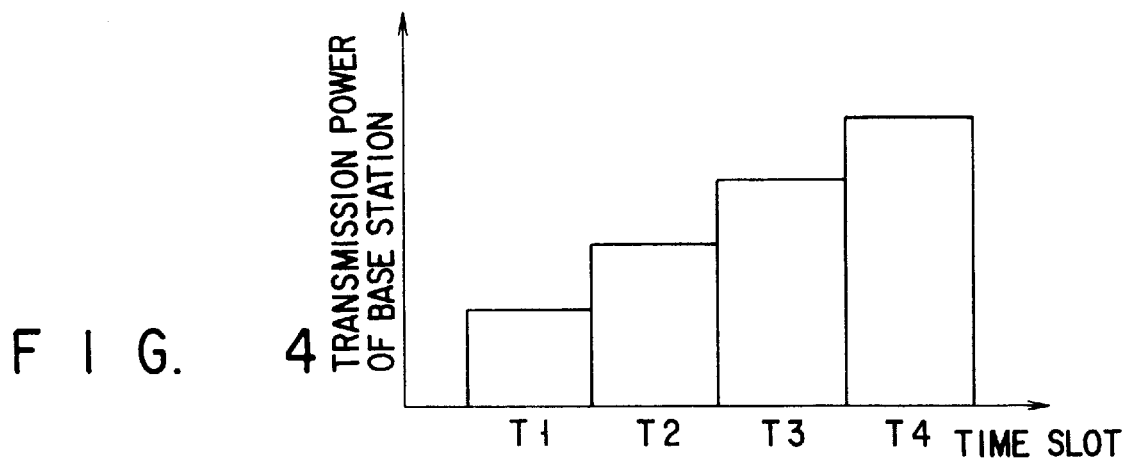
FIG. 4 shows a transmission power level for each slot in a base station of this embodiment.

In the system of the present embodiment, the transmission power of the base station BS1, BS2, ... is controlled at a predetermined level for each of the slots T1 to T4 of the forward link. In the case of FIG. 3A, when a radio communication signal is transmitted from the base station BS to the mobile station located in the farthest area A4, a high transmission power is needed. When the radio communication signal is transmitted to the mobile stations located in closer areas A1 to A3, a transmission power lower than that for transmission to the area A4 is adequate. Accordingly, as shown in FIG. 4, the transmission power is set at a maximum value in the slot T4 corresponding to the area A4 farthest from the base station BS. In the slots T3, T2 and T1 corresponding to the areas A3, A2 and A1, the transmission power is decreased in a stepwise manner as the distance between the base station BS and the area increases. Thus, fine control is not needed, as compared to the case where the base station successively controls the transmission power, and the base station can be constructed at low cost. Furthermore, the dynamic range of the mobile station may be narrow.

The structures of the base station and mobile station used in the above system will now be described in detail.

Figure 5:
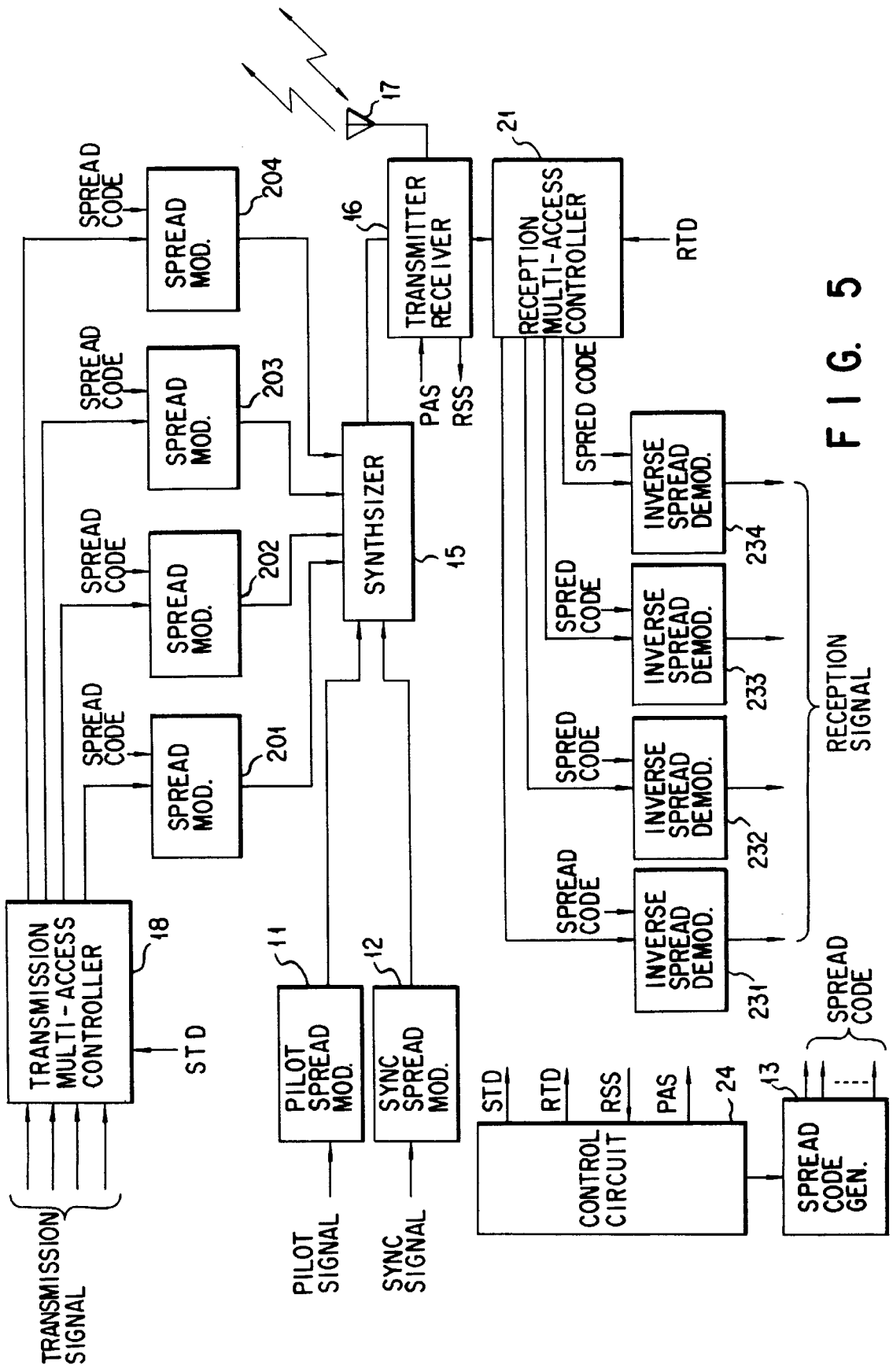
FIG. 5 is a circuit block diagram showing the structure of a main part of the base station according to the present invention.

FIG. 5 is a circuit block diagram showing the structure of a main part of the base station. Pilot information and sync information generated by a sync signal generating circuit 10 are input to a pilot spread modulator 11 and a sync spread modulator 12, respectively. Each of the spread modulators 11 and 12 includes a multiplier for spreading the spectrum of the input signal by using spread codes generated from a spread code generator 13 for generating predetermined spread codes on the basis of control signals from the control circuit 24. The spread ratio of the spread codes is set at 127 so that the spread code rate may be set at 8.13 Mbps. The spread-modulated pilot information and sync information are synthesized by a synthesizer 15 and input to a transmitter/receiver 16. The transmitter/receiver 16 frequency-converts the signal from the synthesizer 15 to a signal with the first radio frequency f1. The frequency-converted signal is transmitted to the mobile station via an antenna 17. The transmission of the pilot information and sync information with use of the first radio frequency f1 is carried out at all times.

On the other hand, speech data units for four channels outputted from a Codec (not shown) are input to a transmission multiple access controller 18. The transmission multiple access controller 18 inserts each of the speech data units into any one of the four slots in accordance with a slot allocation command STD from the control circuit 24. For the insertion into the slot, the speech data units are compressed to ⅛, for example, at 1.075 Kbps to 8 Kbps. The speech data units of four slots, output from the transmission multiple access controller 18, are input to spread modulators 201 to 204. The spread modulators 201 to 204 spread-modulate the speech slot data units by using inherent spread codes generated from the spread code generator 13. The spread code generator 13 generates different codes for the respective destination mobile stations. The spread ratio of spread codes is set at 127 so that the spread code rate can be set at 8.13 Mbps, like the pilot signal and sync signal transmitted with the first radio frequency f1.

The spread-modulated speech slot data units are synthesized by the synthesizer 15 and input to the transmitter/receiver 16. The transmitter/receiver 16 frequency-converts the signal from the synthesizer 15 to a signal of the second radio frequency f2. The frequency-converted signal is amplified by a built-in transmission power amplifier (not shown) to a predetermined level set for each of time slots T1 to T4 and the amplified signal is transmitted to the mobile station MS via the antenna 17. The transmission power level of each of time slots T1 to T4 is set in accordance with transmission power control information PAS from the control circuit 24, as shown in FIG. 4. In other words, the transmission power control information PAS is a control signal for setting the transmission power for each slot, as shown in FIG. 4.

On the other hand, the radio carrier wave signal of the second radio frequency f2 transmitted from the mobile station MS is received by the transmitter/receiver 16 via the antenna 17. In the receiver 16, the received radio carrier wave signal is frequency-converted to an intermediate frequency signal and input to a reception multiple access controller 21. The reception multiple access controller 21 separates the received intermediate frequency signal to intermediate frequency signals for the respective slots R1 to R4 in accordance with a slot allocation command RTD from the control circuit 24 and feeds the separated signals to inverse spread demodulators 231 to 234. The inverse spread demodulators 231 to 234 inverse-spread and then demodulate the received intermediate frequency signals by using the inherent spread codes corresponding to the transmission-side mobile station generated from the spread code generator 13. Thus, reception data of the base band is obtained. The obtained reception signal is fed to and decoded by a CODEC (not shown) in order to reproduce the speech signal.

Figure 6:
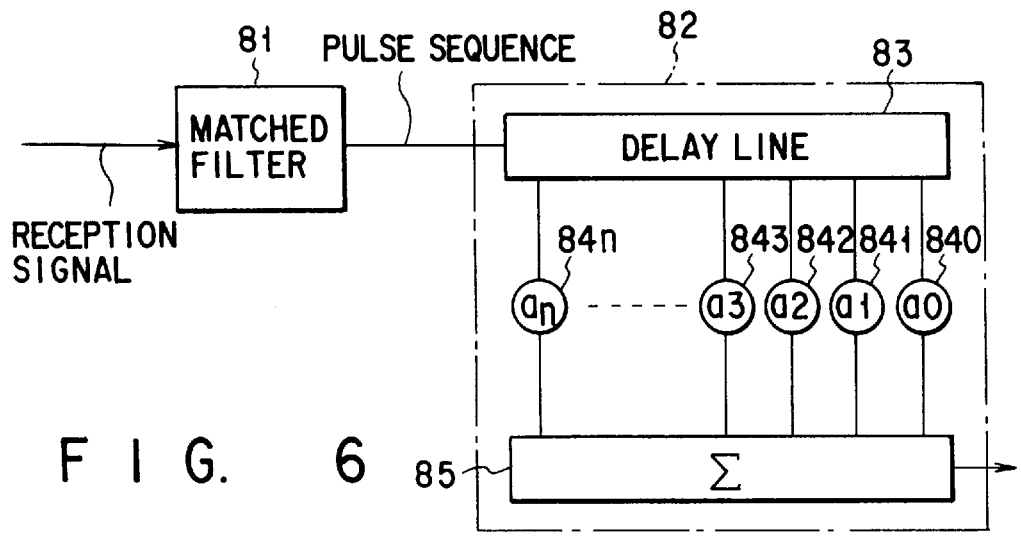
FIG. 6 is a circuit block diagram showing an example of the structure of a RAKE receiver.
Figure 7:
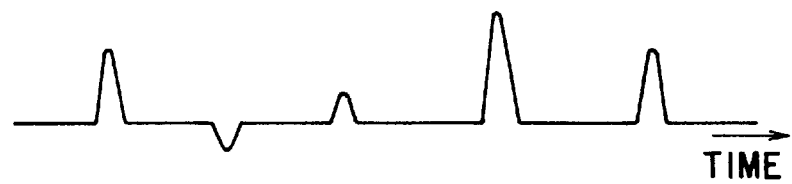
FIG. 7 shows an output pulse waveform of a matched filter shown in FIG. 7.

A RAKE receiver is used as a reception circuit of the transmitter/receiver 16. FIG. 6 is a circuit block diagram showing an example of the structure of the RAKE receiver. A matched filter 81 is provided in a preceding stage of a RAKE receiver 82. If a radio carrier wave signal is input to the matched filter 81, the matched filter 81 outputs a pulse sequence having a plurality of peaks in accordance with an incoming time and a signal intensity, as shown in, e.g. FIG. 7. The RAKE receiver 82 comprises tapped transversal filters arranged at a time interval corresponding to an inverse number of a spread code rate (a chip rate). Specifically, the pulse sequence output from the matched filter 81 is delayed by a delay line 83 so as to have a time interval corresponding to an inverse number of the spread code rate and input to taps $84_0$ to $84_n$. In these taps $84_0$ to $84_n$, the delayed pulse sequences are weighted with tap coefficients $a_0$ to $a_n$ and are added by an adder 85.

The control circuit 24 includes, for example, a microcomputer as a main control unit and also includes slot allocation control means and transmission power control means for performing communication control of CDMA-TDMA-TDD system.

When a communication link for radio connection control and speech is constituted between the base station and the mobile stations the slot allocation control means determines the slot to be allocated to the mobile station on the basis of measurement information on received electric field intensity informed from the mobile station and information (FIG. 3B) representing the correspondency between the received electric field intensity pre-stored in the memory table and the allocated slot. In addition, the slot allocation control means delivers slot allocation command information STD/RTD to the transmission multiple access controller 18 and reception multiple access controller 21 respectively.

The transmission power control means determines the transmission power level corresponding to the slot allocated by the slot allocation control means, on the basis of information (FIG. 4) representing the correspondency between the transmission power level pre-stored in the memory table and the slot. The transmission power control means then delivers command information PAS of the determined transmission power level to the transmitter/receiver 16. The transmission power level is given not as one fixed value but as upper and lower limit values defining a predetermined range.

The above-described slot-by-slot control of the transmission power of the base station is a closed-loop control. However, the transmitter/receiver 16 may be provided with a detection circuit for detecting, with respect to each of slots R1 to R4, the received electric field intensity of the radio carrier wave signal of the second radio frequency f2 coming from the mobile station, and an open-loop control can be performed on the basis of the value of the received electric field intensity detected by the detection circuit.

Figure 8:
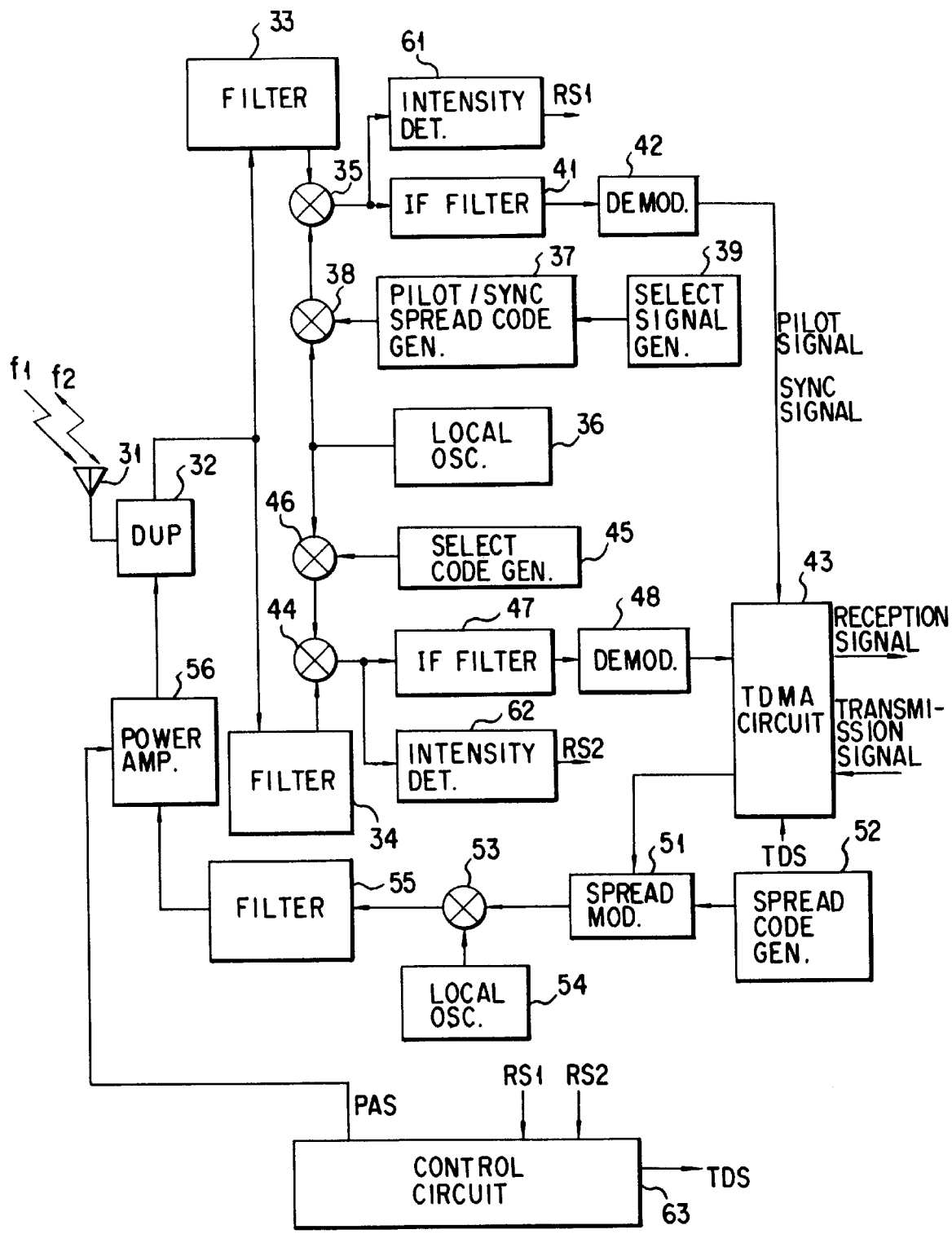
FIG. 8 is a circuit block diagram showing the structure of a main part of a mobile station according to the present embodiment.

FIG. 8 is a circuit block diagram showing the structure of a main part of the mobile station.

In FIG. 8, a radio carrier wave transmitted from the base station is received by an antenna 31 and input to first and second reception filters 33 and 34 via an antenna duplexer (DUP) 32.

The first reception filter 33 has such band characteristics as to pass the first radio frequency f1. The radio carrier wave signal of the first radio frequency f1, which has passed through the first reception filter 33, is input to a mixer 35. The mixer 35 receives a signal produced by a mixer 38 which mixes a reception local oscillation signal corresponding to the first radio frequency f1 generated from a local oscillator 36 and a spread code generated from a pilot/sync spread code generator 37. The mixer 35 mixes the radio carrier wave signal of the first radio frequency f1 and the reception local oscillation signal and frequency-converts the input signals to an intermediate frequency signal. The intermediate frequency signal is multiplied with the spread code and inversely spread. An unnecessary wave component is filtered out from the inversely spread reception intermediate frequency signal by an intermediate frequency filter 41. The filtered signal is input to a demodulator 42 and demodulated into pilot information and sync information. The demodulated pilot information and sync information are supplied to a TDMA circuit 43 as timing information for TDMA-TDD control.

The pilot/sync spread code generator 37 has functions of generating a spread code for pilot information and a spread code for sync information. A selection signal generator 39 determines which of the spread codes should be generated. The circuit configuration can be simplified by performing, with a single circuit, the generation of the spread code for pilot information and the generation of the spread code for sync information.

On the other hand, the second reception filter 34 has such band characteristics as to pass the second radio frequency f2. The radio carrier wave signal of the second radio frequency f2, which has passed through the second reception filter 34, is input to a mixer 44. The mixer 44 also receives a signal obtained by a mixer 46 which mixes a reception local oscillation signal corresponding to the second radio frequency f2 generated from the local oscillator 36 and a spread code generated by a spread code generator 45. In the mixer 44, the radio carrier wave signal of the second radio frequency f2 is mixed with the reception local oscillation signal, is frequency-converted to an intermediate frequency signal, and is multiplied by the spread code and inversely spread. An unnecessary wave component is removed from the inversely-spread reception intermediate frequency signal by an intermediate frequency filter 47. The signal output from the intermediate frequency filter 47 is input to a demodulator 48. The demodulator 48 demodulates the input signal to reception data. The demodulated reception signal is input to the TDMA circuit 43. In the TDMA circuit 43, reception data of the slot allocated to this mobile station is separated and extracted from the reception signal in accordance with slot allocation information TDS delivered from a control circuit 63. The extracted reception data is supplied to a CODEC (not shown) for reproducing speech data.

Transmission data output from the CODEC (not shown) is compressed to 8 Kbps to 64 Kbps in the TDMA circuit 43 and inserted into the slot allocated to the present mobile station. The transmission slot data is input to a spread modulator 51. In the modulator 51, the transmission slot data is spread-modulated on the basis of a transmission spread code proper to the present mobile station, which is generated by a transmission spread code generator 52. The modulator 52 outputs a spread-modulated signal. The spread ratio of the spread code is set at 127 so that the spread code rate can be set at 8.13 Mbps.

In a mixer 53, the spread-modulated signal output from the modulator 51 is mixed with a transmission local oscillation signal generated by a local oscillator 54 and frequency-converted to a radio carrier wave signal of the second radio frequency f2. The band of the radio carrier wave signal is limited by a transmission filter 55 and power-amplified by a transmission power amplifier 56. The amplified signal is supplied to the antenna 31 via the antenna duplexer. From the antenna 31, the amplified signal is transmitted to the base station.

The control circuit 63 includes a microcomputer as a main control unit. The control circuit 63 has, as a functional means, radio communication control means based on the CDMA-TDMA-TDD system. The control means receives from the received electric field intensity detection circuit 61 the detection information of the received electric field intensity of the radio carrier wave transmitted from the base station with the first radio frequency f1. The control means sends the detection information of the received electric field intensity to the base station by making use of a predetermined slot of the second radio frequency f2. In addition, the control means designates the slot to be used in the TDMA circuit 43, in accordance with the slot allocation command transmitted from the base station in reply to the sent detection information. Furthermore, the control means receives from the received electric field intensity detection circuit 62 the detection information of the received electric field intensity of the radio carrier wave transmitted from the base station with the second radio frequency f2. Based on the received detection information, the control means controls transmission power in an open-loop.

The operation of the system having the above structure will now be described.

(i) Assume that the mobile stations MS1 to MS14 are located, as shown in FIG. 3A, and speech operations have been made in the mobile stations MS1 to MS14 or the mobile stations MS1 to MS14 have received incoming signals. In this cases the mobile stations MS1 to MS14 receive radio carrier waves transmitted from the base station BS1 with the first frequency f1 and detect the received electric field intensity of the radio carrier waves.

(ii) The mobile stations MS1 to MS14 send the detection information of the received electric field intensity to the base station BS1 by using a predetermined slot of the radio frequency for control or the second radio frequency f2. Since the signal of radio frequency f1 is transmitted at a constant intensity at all times, the distance between the base station and mobile station can be measured by measuring the received electric field intensity.

(iii) When the base station BS1 has received the detection information of the received electric field intensity from the mobile stations MS1 to MS14, the base station BS1 determines the slots to be allocated to the mobile stations MS1 to MS14, on the basis of the detection information of the received electric field intensity and the information pre-stored in a memory table representing the correspondency between the received electric field intensity (distance) and the allocated slots, as shown in FIG. 3B.

For example, the mobile station MS1 is located in the area A4 farthest from the base station BS1. Thus, the received electric field intensity level of the radio carrier waves coming from the base station BS1 is the lowest. Accordingly, the base station BS1 allocates the slots T4/R4 to the mobile station MS1 on the basis of the detection information of the received electric field intensity sent from the mobile station MS1. Since the mobile station MS2 is also located in the area A4, the received electric field intensity is the lowest. Accordingly, the base station BS1 allocates the slots T4/R4 to the mobile station MS2, similarly with the mobile station MS1.

By contrast, the mobile station MS3 is located in the area A1 closest to the base station BS1. Thus, the received electric field intensity in the mobile station MS3 is the highest. Accordingly, the base station BS1 allocates the slots T1/R1 to the mobile station MS3.

In a similar manner, the slots T1/R1 are allocated to the mobile station MS9, like the mobile station MS3. The slots T2/R2 are allocated to the mobile stations MS4, MS10 and MS13. The slots T3/R3 are allocated to the mobile stations MS6, MS8, MS12 and MS14. The slots T4/R4 are allocated to the mobile stations MS1, MS2, MS5, MS7 and MS11.

(iv) If the slots to be allocated have been determined in this manner, the slot allocation command information items STD/RTD are delivered to the transmission multiple access controller 18 and reception multiple access controller 21, respectively, in the base station BS1. In addition, the base station BS1 sends to the mobile station the slot allocation command information by using a predetermined slot of the radio frequency for control or the second radio frequency f2.

(v) Thus, access channels or speech channels are formed between the base station BS1 and mobile stations MS1 to MS14 in accordance with the received electric field intensity detected by each mobile station, that is, by using the slot allocated in accordance with the distance between the base station BS1 and each mobile station. With these channels being formed, radio connection control or radio speech communication is performed between the base station BS1 and mobile stations MS1 to MS14 on the basis of the CDMA-TDMA-TDD system. In this case, the transmission power level in the slots T1 to T4 in the base station BS1 is controlled, as shown in FIG. 4, such that the transmission power level is highest in the slot T4 corresponding to the remotest area A4 and gradually decreases in the slots T3, T2 and T1 in this order. Accordingly, in FIG. 3A, the transmission at the highest transmission power level is performed with respect to the mobile stations MS5, MS7 and MS11 located in the area A4 farthest from the base station BS1, and the transmission at the lowest transmission power level is performed with respect to the mobile stations MS3 and MS9 located in the area A1 closest to the base station BS1.

In the above-described control of the transmission power level for each of the forward link slots T1 to T4, the base station BS1 may detect the received electric field intensity of each of the reverse link slots R1 to R4 coming from the mobile stations with the second radio frequency f2 and finely adjust the transmission power level of the forward link slots T1 to T4 on the basis of the detection result. Specifically, in the base station BS1, the transmission power level can be controlled by the open-loop using the second radio frequency f2.

(vi) A description will now be given of the case where the mobile station has moved during radio communication and the area to which the mobile station belongs has changed. During the communication, the mobile station measures the received electric field intensity of the radio carrier wave signal for synchronization transmitted periodically from the base station BS1, BS2, . . . at a constant transmission power with the first radio frequency f1, thereby measuring the distance between the mobile station and the base station. If the change of the area in which the mobile station locates is detected, the slot is reallocated in accordance with the area. Specifically, if the mobile station approaches the base station and enters the area A1 from the area A2, the slots T2/R2 allocated to the mobile station in the area A2 are changed to the slots T1/R1. If the allocated slots of the present mobile station are changed and the spread code which is to be used by the present mobile station has already been used by another mobile station, the spread code of the present mobile station needs to be changed. However, there may be a case where all spread codes have already been used. In this case, the slots are not changed or the slots are changed to other slots irrespective of the correspondency between the slots and areas.

As has been described above, in the system of the present embodiment, the forward link slots T1 to T4 and reverse link slots R1 to R4 are time-division multiplexed on the single radio frequency f2. The received electric field intensity of the pilot/sync signal coming from the base station BS1 is detected by the mobile station, MS1 to MS14. The detection information is sent to the base station BS1, and the base station BS1 selects the slots from among the slots T1 to T4/R1 to R4, which correspond to the sent detection value of the received electric field intensity, and allocates the selected slots to the mobile station. Accordingly, the mobile stations MS1 to MS14 performs radio communication with the base station BS1, with the same slots used by the mobile stations having the same distance from the base station. Thus, the mobile stations located far from, the base station BS1 and the mobile stations near the base station BS1 do not transmit electric waves simultaneously. Even if the received electric field intensity of electric waves coming from the mobile station (e.g. MS3) located near the base station BS1 is greater than the received electric field intensity of electric waves coming from the mobile station (e.g. MS1) located far from the base station BS1, the base station BS1 can surely receive the radio communication signal from the remote mobile station MS1. Since the "near-far" problem among mobile stations is surely solved, there is no need to precisely control the transmission power of each mobile station. Therefore, the control system of the transmission power can be simplified, and the manufacturing cost of the mobile station can be reduced.

If speaking in an exaggerated manner, the transmission power control for mobile stations is not necessary in the system of the present embodiment, and any of the mobile stations can perform transmission at a constant transmission power. FIG. 9 shows the received electric field intensity in each slot in the base station in this case. In the conventional system, in order to solve the "near-far" problem, it is necessary to control the transmission power level of the mobile stations so that transmission waves from the mobile stations can be received by the base station with a constant received electric field intensity, wherever the mobile stations are located in the cell. In this case, therefore, the precise transmission power control is indispensable.

In the present embodiment, in order to perform TDMA-TDD communication, transmission data is compressed to, e.g. 8 Kbps to 64 Kbps and the compressed transmission data is spectrum-spread at a spread ratio of 127. Thus, the spread code rate (chip rate) becomes 8.13 Mbps and the frequency band is widened. Thus, the influence of multi-path fading is reduced and the temporal resolution based on the spread code rate reduces to about 120 nsec. Accordingly, when the RAKE receiver is used as a reception circuit, effective diversity synthesis can be performed and higher-quality radio communication can be performed.

FIGS. 10 and 11 are actual measurement graphs showing the state of occurrence multi-path fading in the case where the spread code rate is set at 8 Mbps and 1.2 Mbps, respectively (quoted from Donald L. Schilling, et al., PIMRC '93 "BROADBAND CDMA FOR INDOOR AND OUTDOOR PERSONAL COMMUNICATION", Lecture No. D1.2). In FIGS. 10 and 11, the ordinate indicates a correlator output of a reception signal, and the abscissa indicates the time of the correlator in which spread codes are displaced on a one-chip-by-one-chip basis. As is obvious from the figures, the influence of multi-path fading can be reduced by increasing the spread code rate and widening the frequency band.

Furthermore, in the present embodiment, while the mobile station remote from the base station BS1 is performing transmission, the mobile station near the base station BS1 does not perform transmission at all. Thus, the mobile station remote from the base station can perform transmission at a lower transmission power than in the prior art. As a results interference with an adjacent cell can be reduced. Similarly, while the mobile station near the base station BS1 is performing transmission; the mobile station remote from the base station BS1 does not perform transmission at all. Thus, the base station BS1 can receive radio carrier waves from the mobile station near the base station, without suffering radio interference with the mobile station remote from the base station. Therefore, the mobile station near the base station BS1 does not need to precisely control the transmission power level and thereby the transmission with a higher transmission power than in the prior art can be performed.

The present invention is not limited to the above embodiment. For example, in the above embodiment, the first radio frequency f1 is set as frequency for transmission of the pilot/sync signal. However, if timing information is extracted from the signal transmitted with the second frequency f2 to synchronize the frames and slots, it is possible to make unnecessary the transmission of the pilot/sync signal with the first radio frequency f1. Thus, the first radio frequency f1 can be used as frequency for communication data transmission. Thereby, the number of communication channels such as access channels and speech channels can be doubled.

In addition, in the above embodiment, the TDMA-TDD system is adopted in order to achieve the open-loop transmission power control for the mobile station. When there is no particular need to perform the open-loop transmission power control, that is, when the transmission power of the mobile station is not controlled or can be controlled in a closed-loop, different frequencies may be used for the forward link and the reverse link.

Without departing from the spirit of the invention, other various modifications may be made to the means for measuring the distance between the base station and mobile station, the method of allocating the slots, the types and structures of the base station and mobile station, the type of the system, the value of the spread code rate, etc.

Industrial Applicability

As has been described above in detail, in the present invention, a common radio frequency is allocated to a forward link extending from a base station to a mobile station and a reverse link extending from the mobile station to the base station, and a transmission format of a radio communication signal transmitted with the common radio frequency is constituted such that a plurality of forward link slots and a plurality of reverse link slots are time-division multiplexed. In the base station and mobile station, information associated with the distance between both stations is detected at the time of communication. In accordance with the detected distance information a predetermined forward link slot and a predetermined reverse link slot are selected from the plurality of forward link slots and reverse link slots. The selected forward link slot and reverse link slot are allocated to the radio communication between the mobile station and base station.

Accordingly, the present invention can provide a mobile radio communication system capable of effectively solving the "near-far" problem without precisely controlling the transmission power of the mobile station, thereby enhancing the quality of speech and the reliability of radio connection control.

I claim:

1. A mobile radio communication system for performing radio communication between a base station and a plurality of mobile stations by using a spread spectrum method, wherein a common frequency is allocated to a forward link from the base station to the mobile station and to a reverse link from the mobile station to the base station, and a signal transmitted with the common frequency has a communication format in which a plurality of forward link slots and a plurality of reverse link slots are time-division multiplexed, at least one of said base station and said mobile station comprising:

means for detecting a distance between the mobile station and the base station; and means for selecting a predetermined forward link slot and a predetermined reverse link slot from among the forward link slots and the reverse link slots on the basis of the detection result of said distance detection means, and allocating the selected slots to radio communication between the base station and the mobile station.

2. The mobile radio communication system according to claim 1, wherein said base station transmits at least sync information to the mobile station by using a sync radio frequency different from the common frequency of said forward link and said reverse link, and said mobile station performs radio communication via the forward link and the reverse link on the basis of the sync information transmitted from the base station.

3. The mobile radio communication system according to claim 2, wherein said distance detection means is provided in said mobile station, and comprises means for measuring a received electric field intensity of said sync information transmitted from the base station, and means for transmitting a measured result of the received electric field intensity to the base station, and said slot allocation means is provided in the base station, and comprises means for allocating to the radio communication a predetermined forward link slot and a predetermined reverse link slot of said slots associated with the received electric field intensity, on the basis of the measured result of the received electric field intensity transmitted from the mobile station.

4. The mobile radio communication system according to claim 3, wherein said base station comprises means for controlling a transmission power for the radio communication for each of the forward link slots.

5. A mobile radio communication system for performing radio communication between a base station and a plurality of mobile stations by using a spread spectrum method in which a spread code is allocated to each of the plurality of mobile stations, a speech signal is coded by the allocated spread code, and the coded speech signal communicates with the base station, wherein different frequencies are allocated to a forward link from the base station to the mobile station and to a reverse link from the mobile station to the base station, and a signal transmitted by the forward link and the reverse link has a communication format in which a plurality of forward link slots and a plurality of reverse link slots are time-division multiplexed, at least one of said base station and said mobile station comprising:

means for detecting a distance between the mobile station and the base station; and means for selecting a predetermined forward link slot and a predetermined reverse link slot from among the forward link slots and the reverse link slots on the basis of the detection result of said distance detection means, and allocating the selected slots to radio communication between the base station and the mobile station.

6. The mobile radio communication system according to claim 5, wherein said base station transmits at least sync information to the mobile station by using a sync radio frequency different from a radio frequency of said forward link and said reverse link, and said mobile station performs radio communication via the forward link and the reverse link on the basis of the sync information transmitted from the base station.

7. The mobile radio communication system according to claim 6, wherein said distance detection means is provided in said mobile stations and comprises means for measuring a received electric field intensity of said sync information transmitted from the base station, and means for transmitting a measured result of the received electric field intensity to the base station, and said slot allocation means is provided in the base station, and comprises means for allocating to the radio communication a predetermined forward link slot and a predetermined reverse link slot of said slots associated with the received electric field intensity, on the basis of the measured result of the received electric field intensity transmitted from the mobile station.

8. The mobile radio communication system according to claim 7, wherein said base station comprises means for controlling a transmission power for the radio communication for each of the forward link slots.

9. A radio communication system for performing radio communication between a base station and a plurality of mobile stations, said system comprising:

time-division multiplexing means for dividing a speech channel between the base station and a mobile station into a plurality of slots and allocating a predetermined slot to the mobile station in accordance with information relating to a distance between the mobile station and the base station; and code division multiple access means for assigning different codes to a plurality of said mobile stations that have been allocated the predetermined slot.

10. The radio communication system according to claim 9, wherein said plurality of slots are associated with the distance between the base station and the mobile station, and said time-division multiplexing means comprises means for acquiring the information relating to the distance between the base station and the mobile station, and means for allocating the slot associated with the acquired information relating to the distance to the mobile station.

11. The radio communication system according to claim 10, wherein said information acquiring means is provided in the mobile station and comprises means for acquiring the information relating to the distance by measuring a received electric field intensity of a sync radio carrier wave signal transmitted from the base station at a constant intensity.

12. The radio communication system according to claim 9, wherein said time-division multiplexing means comprises means for reallocating the slots upon detecting a change in distance between the mobile station and base station during speech communication.

13. The radio communication system according to claim 12, wherein said slot reallocation means prohibits the reallocation of the slots, when code division multiplexing of the reallocated slots is impossible.

14. The radio communication system according to claim 9, wherein a forward link for speech signal transmission from the base station to the mobile station and a reverse link for speech signal transmission from the mobile station to the base station have different frequencies in the speech channel.

15. The radio communication system according to claim 9, wherein a forward link for speech signal transmission from the base station to the mobile station and a reverse link for speech signal transmission from the mobile station to the base station have the same frequency in the speech channel.

16. The radio communication system according to claim 9, wherein said code division multiple access means comprises means for spread-modulating a communication signal by using a predetermined spread code, and means for assigning different spread codes to the respective mobile stations.

17. The radio communication system according to claim 9, wherein said plurality of slots are associated with the distance between the base station and the mobile stations, and said base station comprises means for transmitting a signal with a power which increases as the distance between the base station and the mobile station increases and which decreases as this distance decreases.

18. The radio communication system according to claim 9, wherein said base station comprises a RAKE receiver.

19. The radio communication system according to claim 9, wherein said mobile station comprises means for controlling a transmission power in accordance with the distance between the mobile station and the base station.

20. A mobile station for use in a mobile radio communication system, wherein radio communication is performed between a base station and the mobile station by using a spread spectrum method, and a common frequency is allocated to a forward link from the base station to the mobile station and to a reverse link from the mobile station to the base station, and a signal transmitted with the common frequency has a communication format in which a plurality of forward link slots and a plurality of reverse link slots are time-division multiplexed, the mobile station comprising:

means for acquiring information relating to a distance between the mobile station and the base station; and means for transmitting a signal including the acquired information to the base station.

21. The mobile station according to claim 20, further comprising means for performing radio communication via the forward link and the reverse link on the basis of sync information transmitted from the base station.

22. The mobile station according to claim 21, wherein said information acquiring means comprises means for measuring a received electric field intensity of said sync information transmitted from the base station, and means for transmitting the measured electric field intensity to the base station.

23. The mobile station according to claim 20, wherein said information acquiring means comprises means for measuring a received electric field intensity of a sync radio carrier wave signal transmitted from the base station at a constant intensity.

24. The mobile station according to claim 20, wherein the forward link from the base station to the mobile station and the reverse link from the mobile station to the base station have different frequencies in a speech channel.

25. The mobile station according to claim 20, wherein the forward link from the base station to the mobile station and the reverse link from the mobile station to the base station have a same frequency in a speech channel.

26. The mobile station according to claim 20, further comprising means for controlling a transmission power in accordance with the distance between the mobile station and the base station.

27. A base station for use in a mobile radio communication system, wherein radio communication is performed between a mobile station and the base station by using a spread spectrum method, and a common frequency is allocated to a forward link from the base station to the mobile station and to a reverse link from the mobile station to the base station, and a signal transmitted with the common frequency has a communication format in which a plurality of forward link slots and a plurality of reverse link slots are time-division multiplexed, the base station comprising:

means for storing the plurality of forward and reverse link slots, each slot being associated with information relating to a distance between the base station and the mobile station;

means for receiving a signal from the mobile station, the signal including information relating to the distance between the base station and the mobile station; and means for selecting one of the stored forward link slots and one of the stored reverse link slots associated with the received information, and allocating the selected slots to radio communication between the base station and the mobile station.

28. The base station according to claim 27, further comprising means for transmitting at least sync information to the mobile station by using a sync radio frequency different from the common frequency of said forward link and said reverse link.

29. The base station according to claim 28, wherein said receiving means includes means for receiving an electric field intensity transmitted from the mobile station, and said slot allocation means comprises means for allocating to the radio communication the slots based on the received electric field intensity.

30. The base station according to claim 29, further comprising means for controlling a transmission power for the radio communication for each of the forward link slots.

31. The base station according to claim 27, further comprising means for reallocating the slots upon detecting a change in distance between the mobile station and base station during speech communication.

32. The base station according to claim 31, wherein said slot reallocation means prohibits the reallocation of the slots when code-division multiplexing of the reallocated slots is impossible.

33. The base station according to claim 27, wherein the forward link from the base station to the mobile station and the reverse link from the mobile station to the base station have different frequencies in a speech channel.

34. The base station according to claim 27, wherein the forward link from the base station to the mobile station and the reverse link from the mobile station to the base station have a same frequency in a speech channel.

35. The base station according to claim 27, further comprising means for spread-modulating a communication signal by using a predetermined spread code, and means for assigning different spread codes to a plurality of mobile stations.

36. The base station according to claim 27, further comprising means for transmitting a signal with a power which increases as the distance between the base station and the mobile station increases and which decreases as this distance decreases.

37. The base station according to claim 27, wherein said base station comprises a RAKE receiver.

38. A mobile station for use in a mobile radio communication system, wherein radio communication is performed between a base station and the mobile station by using a spread spectrum method, and different frequencies are allocated to a forward link from the base station to the mobile station and to a reverse link from the mobile station to the base station, and a signal transmitted by the forward link and reverse link has a communication format in which a plurality of forward link slots and a plurality of reverse link slots are time-division multiplexed, the mobile station comprising:

means for acquiring information relating to a distance between the mobile station and the base station; and means for transmitting a signal including the acquired information to the base station.

39. A base station for use in a mobile radio communication system, wherein radio communication is performed between a mobile station and the base station by using a spread spectrum method, and different frequencies are allocated to a forward link from the base station to the mobile station and to a reverse link from the mobile station to the base station, and a signal transmitted by the forward link and reverse link has a communication format in which a plurality of forward link slots and a plurality of reverse link slots are time-division multiplexed, the base station comprising:

means for storing the plurality of forward and reverse link slots, each of said slots being associated with information relating to a distance between the base station and the mobile station;

means for receiving a signal from the mobile station, the signal including information relating to the distance between the base station and the mobile station; and means for selecting one of the stored forward link slots and one of the stored reverse link slots associated with the received information, and allocating the selected slots to radio communication between the base station and the mobile station.

40. A base station for use in a mobile radio communication system, wherein radio communication is performed between a mobile station and the base station by using a spread spectrum method, and a common frequency is allocated to a forward link from the base station to the mobile station and to a reverse link from the mobile station to the base station, and a signal transmitted with the common frequency has a communication format in which a plurality of forward link slots and a plurality of reverse link slots are time-division multiplexed, the base station comprising:

means for receiving a signal from the mobile station, the signal including information relating to a distance between the base station and the mobile station; and means for selecting a predetermined forward link slot and a predetermined reverse link slot from among the forward link slots and reverse link slots based on the received information, and allocating the selected slots to radio communication between the base station and the mobile station.

41. A base station for use in a mobile radio communication system, wherein radio communication is performed between a mobile station and the base station by using a spread spectrum method in which a spread code is allocated to each of the plurality of mobile stations, a speech signal is coded by the allocated spread code, and the coded speech signal communicates with the base station, and different frequencies are allocated to a forward link from the base station to the mobile station and to a reverse link from the mobile station to the base station, and a signal transmitted by the forward link and reverse link has a communication format in which a plurality of forward link slots and a plurality of reverse link slots are time-division multiplexed, the base station comprising:

means for receiving a signal from the mobile station, the signal including information relating to a distance between the base station and the mobile station; and means for selecting a predetermined forward link slot and a predetermined reverse link slot from among the forward link slots and reverse link slots based on the received information, and allocating the selected slots to radio communication between the base station and the mobile station.

42. A mobile radio communication system for performing radio communication between a base station and a plurality of mobile stations by using a spread spectrum method, wherein different frequencies are allocated to a forward link from the base station to the mobile station and to a reverse link from the mobile station to the base station, and a signal transmitted by the forward link and the reverse link has a communication format in which a plurality of forward link slots and a plurality of reverse link slots are time-division multiplexed, at least one of said base station and said mobile station comprising:

means for transmitting at least sync information from the base station to the mobile station, said mobile station performing radio communication via said forward link and reverse link based on the sync information transmitted from the base station;

means for detecting a distance between the mobile station and the base station; and means for selecting a predetermined forward link slot and a predetermined reverse link slot from among the forward link slots and the reverse link slots on the basis of the detection result of said distance detection means, and allocating the selected slots to radio communication between the base station and the mobile station.

43. The mobile radio communication system according to claim 5, wherein said sync information transmitted from the base station to the mobile station uses a sync radio frequency different from a radio frequency of said forward link and said reverse link.

44. A base station for use in a mobile radio communication system, wherein radio communication is performed between a mobile station and the base station by using a spread spectrum method, and different frequencies are allocated to a forward link from the base station to the mobile station and to a reverse link from the mobile station to the base station, and the base station transmits at least sync information to the mobile station by using a sync radio frequency different from a radio frequency of the forward link and the reverse link, and a signal transmitted by the forward link and reverse link has a communication format in which a plurality of forward link slots and a plurality of reverse link slots are time-division multiplexed, the base station comprising:

means for receiving a signal from the mobile station, the signal including information relating to a distance between the base station and the mobile station; and means for selecting a predetermined forward link slot and a predetermined reverse link slot from among the forward link slots and reverse link slots based on the received information, and allocating the selected slots to radio communication between the base station and the mobile station.

\* \* \* \* \*

UNITED STATES PATENT AND TRADEMARK OFFICE
CERTIFICATE OF CORRECTION

PATENT NO. : 5,914,947
DATED : June 22, 1999
INVENTOR(S) : Naritoshi SAITO

It is certified that error appears in the above-identified patent and that said Letters Patent is hereby corrected as shown below:

Claim 7, Column 15, line 30, "stations" should read --station,--.

Signed and Sealed this

Eighth Day of August, 2000

Attest:

Q. TODD DICKINSON

Attesting Officer

Director of Patents and Trademarks